(12) United States Patent
Schroer et al.

(10) Patent No.: US 11,022,996 B2
(45) Date of Patent: *Jun. 1, 2021

(54) STABILIZATION OF AN ERRATIC INPUT TO A CONTROL SYSTEM

(71) Applicant: General Electric Company, Schenectady, NY (US)

(72) Inventors: Robert Schroer, Loveland, OH (US); Kevin Allen Davis, Springboro, OH (US)

(73) Assignee: General Electric Company, Schenectady, NY (US)

( * ) Notice: Subject to any disclaimer, the term of this patent is extended or adjusted under 35 U.S.C. 154(b) by 328 days.

This patent is subject to a terminal disclaimer.

(21) Appl. No.: 16/025,244

(22) Filed: Jul. 2, 2018

(65) Prior Publication Data
US 2018/0327084 A1 Nov. 15, 2018

Related U.S. Application Data

(63) Continuation of application No. 15/594,900, filed on May 15, 2017, now Pat. No. 10,035,584.

(51) Int. Cl.
*G05F 5/00* (2006.01)
*H02J 1/14* (2006.01)
*B64D 31/06* (2006.01)
*B64D 41/00* (2006.01)

(52) U.S. Cl.
CPC ............... *G05F 5/00* (2013.01); *B64D 31/06* (2013.01); *B64D 41/00* (2013.01); *H02J 1/14* (2013.01); *B64D 2221/00* (2013.01)

(58) Field of Classification Search
CPC ............... G05F 5/00; B64D 41/00; H01J 1/14
USPC .................................................. 701/1
See application file for complete search history.

(56) References Cited

U.S. PATENT DOCUMENTS

| 5,159,542 | A | 10/1992 | Miller et al. |
| 6,269,627 | B1 | 8/2001 | Freese et al. |
| 7,188,019 | B2 | 3/2007 | Nomura et al. |
| 8,417,749 | B1* | 4/2013 | Dick ............... H03H 17/065 708/300 |
| 8,474,268 | B2 | 7/2013 | Fuller et al. |
| 8,892,295 | B2 | 11/2014 | Zaccaria |
| 9,435,267 | B2 | 9/2016 | Myer et al. |
| 9,771,877 | B2 | 9/2017 | Davis, Jr. et al. |
| 10,035,584 | B1* | 7/2018 | Schroer ............... H02J 1/14 |
| 2008/0154473 | A1* | 6/2008 | Volponi ............ G05B 23/0262 701/100 |

(Continued)

*Primary Examiner* — Peter D Nolan
*Assistant Examiner* — Luke Huynh
(74) *Attorney, Agent, or Firm* — Dority & Manning, P.A.

(57) ABSTRACT

One example aspect of the present disclosure relates to a method. The method can include receiving, by one or more computing devices, an input related to power consumption. The method can include filtering, by the one or more computing devices, the received input. The method can include classifying, by the one or more computing devices, the filtered input into one zone of a plurality of zones. The method can include determining, by the one or more computing devices, a setting associated with the classified zone. The setting can determine power production during an idle setting. The method can include causing, by the one or more computing devices, an adjustment to the determined setting at a rate determined by a rate limit.

20 Claims, 6 Drawing Sheets

(56) References Cited

U.S. PATENT DOCUMENTS

| | | | |
|---|---|---|---|
| 2008/0191482 A1* | 8/2008 | Okuno | H02P 9/48 290/7 |
| 2011/0013427 A1 | 1/2011 | Weir et al. | |
| 2012/0083993 A1* | 4/2012 | Shibata | F02P 5/1508 701/103 |
| 2016/0195026 A1 | 7/2016 | Sopcic et al. | |

* cited by examiner

STABILIZATION OF AN ERRATIC INPUT TO A CONTROL SYSTEM

CROSS-REFERENCE TO RELATED APPLICATIONS

The present application is a continuation of U.S. application Ser. No. 15/594,900, filed on May 15, 2017, which is hereby incorporated by reference in its entirety.

FIELD

The present subject matter relates generally to stabilizing an input to a control system.

BACKGROUND

Engines of an aerial vehicle can be used to generate power to satisfy an electrical load for the aerial vehicle. When the aerial vehicle is on the ground, the engines can be set to a minimal thrust, or idle. Thrust generated during an idle setting can be based on a worst case scenario of electrical load usage for the aerial vehicle. Creating more thrust than is necessary for an idle state can cause unnecessary wear and tear on brakes of the aerial vehicle as the brakes are used to keep the aerial vehicle from moving. The brakes also are a key component of slowing the aerial vehicle down upon landing. Having high idle thrust contributes to high brake temperature which can reduce life and affect how fast a plane can take off again after landing. Running at low speeds (low thrust) with high electrical loads can cause the engines to overheat. An actual electrical load demand can move erratically and unexpectedly.

As with aerial vehicles, other vehicles, such as helicopters, automobiles, boats, submarines, and trains, can also have engines that generate power to satisfy an electrical load for users. As with aerial vehicles, the other vehicles can similarly have thrust generated during an idle setting to satisfy the electrical load. The other vehicles can similarly experience harm if they demand high electrical loads in the idle setting. An actual electrical load demand of the other vehicles can move erratically and unexpectedly.

BRIEF DESCRIPTION

Aspects and advantages of embodiments of the present disclosure will be set forth in part in the following description, or may be learned from the description, or may be learned through practice of the embodiments.

Example embodiments of the disclosure are shown in reference to aerial vehicles for examples and illustrations only. Those of ordinary skill in the art will recognize that the disclosure has other application, such as moderating a house's power consumption needs from a smart electricity grid, for example. Further, the methods and systems described herein can have application in vehicles other than aerial vehicles, such as, for example helicopters, automobiles, boats, submarines, trains, and/or any other suitable vehicles.

One example aspect of the present disclosure relates to a method. The method can include receiving, by one or more computing devices, an input related to power consumption. The method can include filtering, by the one or more computing devices, the received input. The method can include classifying, by the one or more computing devices, the filtered input into one zone of a plurality of zones. The method can include determining, by the one or more computing devices, a setting associated with the classified zone. The setting can determine power production during an idle setting. The method can include causing, by the one or more computing devices, an adjustment to the determined setting at a rate determined by a rate limit.

Another example aspect of the present disclosure relates to a system. The system can include a memory device. The system can include one or more computing devices. The one or more computing devices can be configured to receive an input related to power consumption. The one or more computing devices can be configured to filter the received input. The one or more computing devices can be configured to classify the filtered input into one zone of a plurality of zones. The one or more computing devices can be configured to determine a setting associated with the classified zone, wherein the setting is related to power production. The one or more computing devices can be configured to cause an adjustment to the determined setting at a rate determined by a rate limit.

Another example aspect of the present disclosure relates to an aerial vehicle. The aerial vehicle can include a memory device. The aerial vehicle can include one or more computing devices. The one or more computing devices can be configured to receive an input related to power consumption. The one or more computing devices can be configured to filter the received input. The one or more computing devices can be configured to classify the filtered input into one zone of a plurality of zones. The one or more computing devices can be configured to determine a setting associated with the classified zone, wherein the setting determines power production during an idle setting. The one or more computing devices can be configured to cause an adjustment to the determined setting at a rate determined by a rate limit.

Other example aspects of the present disclosure are directed to systems, methods, aerial vehicles, avionics systems, devices, non-transitory computer-readable media for stabilizing input. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
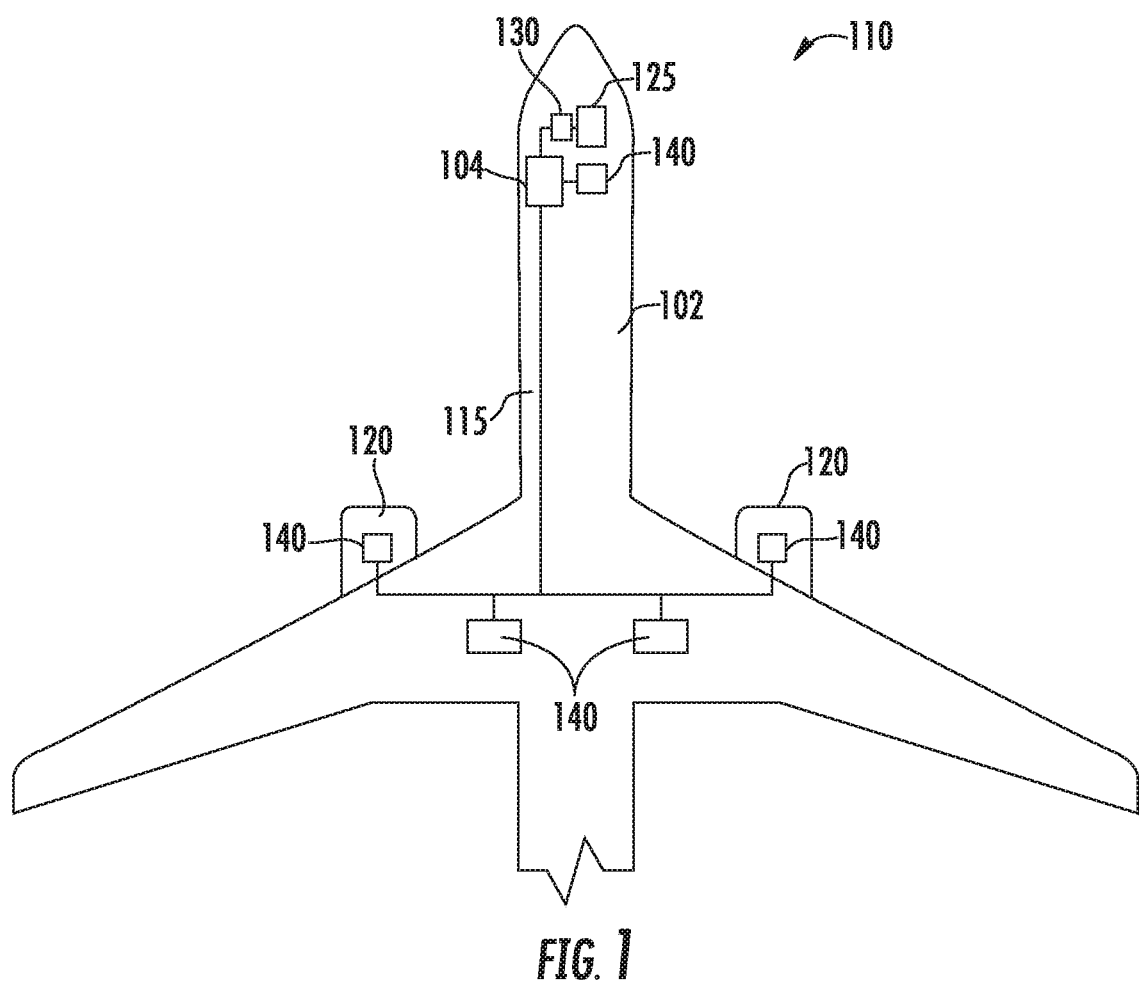
FIG. 1 depicts an aerial vehicle according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

When an aerial vehicle is on the ground, engines of the aerial vehicle can be set to an idle setting. The amount of power generated by engines when operating in an idle setting can generally be based on a worst case scenario of a possible electrical load demand for the aerial vehicle. For example, in a commercial airplane, power generated by engines in an idle setting can allow the passengers and crew full use of all aerial vehicle electrical services. When an engine runs during an idle setting, the brakes need to be applied to the aerial vehicle to prevent the aerial vehicle from moving forward. Excess power can wear out brakes of the airplane. The brakes also can be a key component of slowing the aerial vehicle down upon landing. Having high idle thrust can contribute to high brake temperature which can reduce life and affect how fast a plane can take off again after landing. In order to reduce excess power, the systems and methods described with reference to example aspects of the present disclosure can take the electrical load of the aerial vehicle as an input for a model to determine an amount of power to be generated during an idle setting instead of assuming a worst case scenario.

Tying the power generated by the engines in an idle setting directly to the power load of the aerial vehicle can be difficult because the power load can change erratically, which could cause the engines to power erratically and possibly result in undesirable thrusting of the aerial vehicle. As used herein, an erratic change can include a movement equal to 20% of full capacity in a few milliseconds. For the sake of clarity, an erratic change can also include a movement of an aircraft electrical load from 0% to 100% (or 100% to 0%) near instantaneously. According to aspects of the present disclosure, the value for the electrical load input into the model can be passed through a filter. The filter can reduce noise from the input value.

The model can classify the filtered input into one of a plurality of classification zones. Each classification zone can be associated with a particular idle setting. Each idle setting can be associated with an amount of power generated when the aerial vehicle is operated according to the idle setting.

In some embodiments, the model can define a buffer area between each pair of adjacent classification zones. If a filtered input value is in a first zone at a first time, and a filtered input value is in a buffer area between the first zone and a second zone at a second time, then the filtered input value can be classified as in the first zone at the second time.

In some embodiments, if a classification zone indicates a need to change the idle setting, then the idle setting can be changed at a rate set by a rate limit. Generally, when the zone classification indicates a need to increase power generated by the engines, such increase will need to happen rather quickly. However, when the zone classification indicates an allowance to decrease power generated by the engine, such decrease can happen gradually, to avoid detection by operators of the aerial vehicle and/or passengers. Therefore, in some embodiments, a rate limit associated with an increase in power generated by the engines can be different (e.g., higher) than a rate limit associated with a decrease in power generated by the engines.

In this way, the systems and methods according to example aspects of the present disclosure can have a number of technical effects and benefits. For instance, example aspects of the present disclosure have a technical effect of reducing wear and tear on brakes. For example, when an engine runs during an idle setting, the brakes need to be applied to the aerial vehicle to prevent the aerial vehicle from moving forward. Excess power can wear out brakes of the airplane. The brakes also can be a key component of slowing the aerial vehicle down upon landing. Having high idle thrust can contribute to high brake temperature which can reduce life and affect how fast a plane can take off again after landing.

In some embodiments, the systems and methods of the present disclosure also provide an improvement to a power system, such as a power system of an aerial vehicle. For example, the systems and methods can receive, by one or more computing devices, an input related to power consumption; filter, by the one or more computing devices, the received input; classify, by the one or more computing devices, the filtered input into one zone of a plurality of zones; determine, by the one or more computing devices, a setting associated with the classified zone, wherein the setting determines power production during an idle setting; and cause, by the one or more computing devices, an adjustment to the determined setting at a rate determined by a rate limit. Running at low speeds (low thrust) with high electrical loads can cause the engines to overheat. Continual overheating of aerial vehicles can lead to unscheduled maintenance issues, which can cause flight schedule disruptions. Example aspects of the present disclosure can reduce the computational resources needed to deal with flight disruptions by reducing a risk of an overheated engine in the first place.

FIG. 1 depicts an example system for stabilizing input according to example embodiments of the present disclosure. As shown, the system can include an aerial vehicle 102. The aerial vehicle 102 can include an onboard computing system 110. As shown in FIG. 1, the onboard computing system 110 can include one or more onboard computing device(s) 104 that can be associated with, for instance, an avionics system. The onboard computing device(s) 104 can be coupled to a variety of systems on the aerial vehicle 102 over a communications network 115. The communications network 115 can include a data bus or combination of wired and/or wireless communication links.

The onboard computing device(s) 104 can be in communication with a display system 125 including one or more display device(s) that can be configured to display or otherwise provide information generated or received by the system 110 to flight crew members of the aerial vehicle 102. The display system 125 can include a primary flight display, a multipurpose control display unit, or other suitable flight displays commonly included within a cockpit of the aerial vehicle 102.

The onboard computing device(s) 104 can also be in communication with a flight control computer 130. The flight control computer 130 can, among other things, automate the tasks of piloting and tracking the flight plan of the aerial vehicle 102. The flight control computer 130 can include or be associated with, any suitable number of individual microprocessors, power supplies, storage devices, interface cards, auto flight systems, flight management computers, and other standard components. The flight control computer 130 can include or cooperate with any number of software programs (e.g., flight management programs) or instructions designed to carry out the various methods, process tasks, calculations, and control/display functions necessary for operation of the aerial vehicle 102. The flight control computer 130 is illustrated as being separate from the onboard computing device(s) 104. Those of ordinary skill in the art, using the disclosures provided herein, will understand that the flight control computer 130 can also be included with or implemented by the onboard computing device(s) 104.

The onboard computing device(s) 104 can also be in communication with one or more aerial vehicle control system(s) 140. The aerial vehicle control system(s) 140 can be configured to perform various aerial vehicle operations and control various settings and parameters associated with the aerial vehicle 102. For instance, the aerial vehicle control system(s) 140 can be associated with one or more engine(s) 120 and/or other components of the aerial vehicle 102. The aerial vehicle control system(s) 140 can include, for instance, digital control systems, throttle systems, inertial reference systems, flight instrument systems, engine control systems, auxiliary power systems, fuel monitoring systems, engine vibration monitoring systems, communications systems, flap control systems, flight data acquisition systems, and other systems.

Any or all of the onboard computing system 110, the on board computing device(s) 104, the flight control computer 130, and the aerial vehicle control system(s) 140 can add to an electrical load of the aerial vehicle 102. The total electrical load can be used as an input to a function to determine how much power the one or more engine(s) 120 should generate when the aerial vehicle 102 is in an idle state. For example, a high pressure compressor/turbine rotor speed (e.g., a speed of an N2 turbine) can determine power generation of the one or more engine(s) 120 in an idle state of the aerial vehicle 102. The function will be described in further detail in reference to FIG. 2 below.

The numbers, locations, and/or orientations of the components of example aerial vehicle 102 are for purposes of illustration and discussion and are not intended to be limiting. Those of ordinary skill in the art, using the disclosures provided herein, shall understand that the numbers, locations, and/or orientations of the components of the aerial vehicle 102 can be adjusted without deviating from the scope of the present disclosure.

Figure 2:
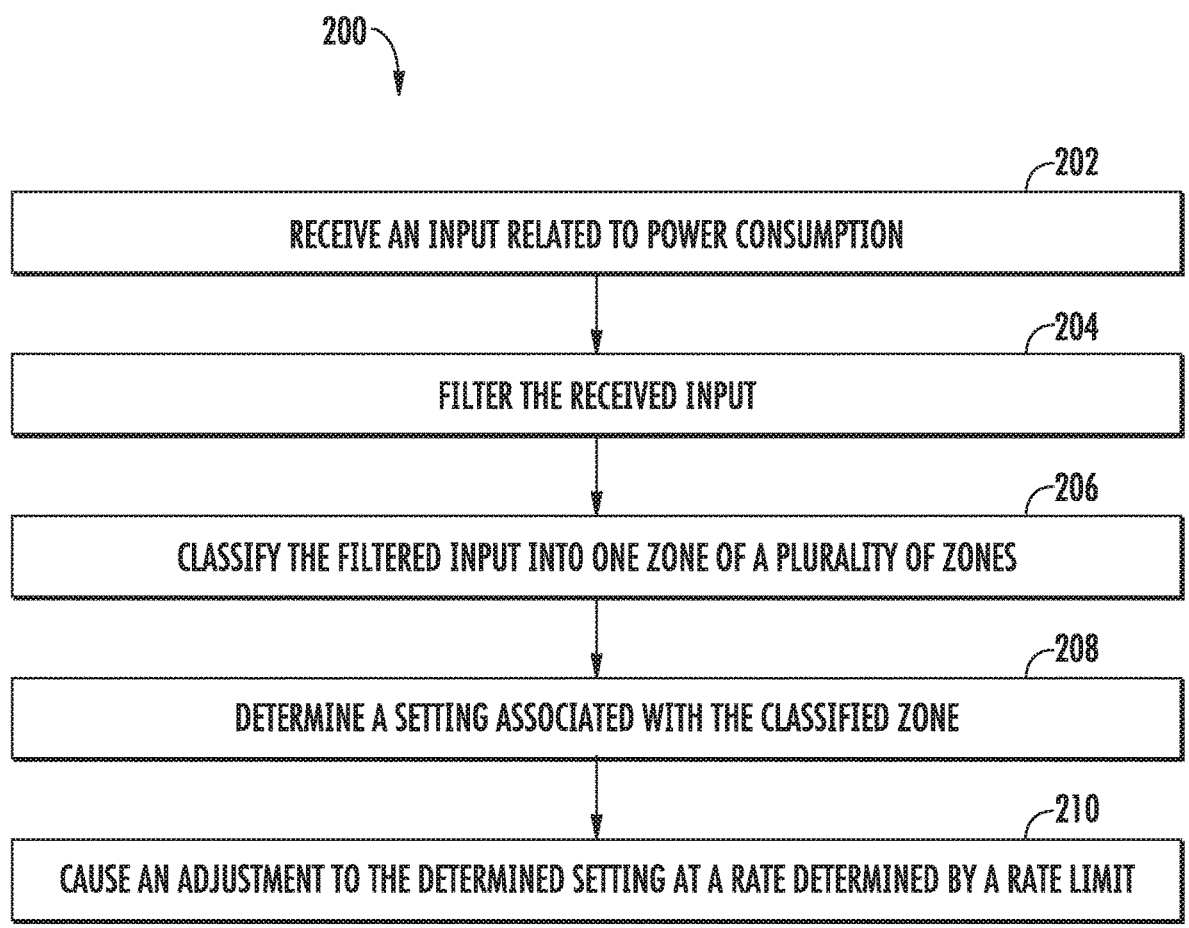
FIG. 2 depicts a flow diagram of an example method according to example embodiments of the present disclosure.

FIG. 2 depicts a flow diagram of an example method 200 for stabilizing input. The method of FIG. 2 can be implemented using, for instance, the one or more computing device(s) 502 of the control system 500 of FIG. 5. FIG. 2 depicts steps performed in a particular order for purposes of illustration and discussion. Those of ordinary skill in the art, using the disclosures provided herein, will understand that various steps of any of the methods disclosed herein can be adapted, modified, rearranged, performed simultaneously or modified in various ways without deviating from the scope of the present disclosure.

At (202), an input related to power consumption can be received. For example, the computing device 502 can receive an input related to power consumption. In an aspect, the input can be an electrical load associated with an aerial vehicle. In an aspect, the input can change erratically. At (204), the received input can be filtered. For example, the computing device 502 can filter the received input. In an aspect, filtering the received input can include removing noise from the received input.

Figure 3:
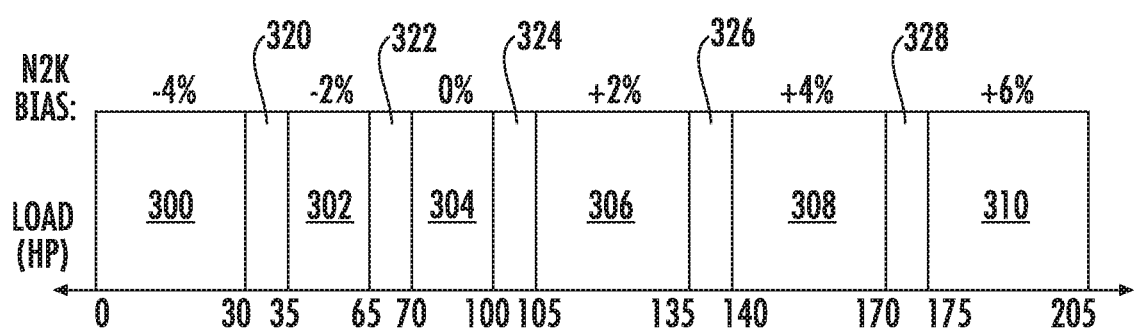
FIG. 3 depicts a classification scheme according to example embodiments of the present disclosure.

At (206), the filtered input can be classified into one zone of a plurality of zones. For example, the computing device 502 can classify the filtered input into one zone of a plurality of zones. Turning now briefly to FIG. 3, classification scheme according to example embodiments of the present disclosure is depicted. Zone 300 can be associated with a filtered input of 0-30 horsepower (hp), zone 302 can be associated with a filtered input of 35-65 hp, zone 304 can be associated with a filtered input of 70-100 hp, zone 306 can be associated with a filtered input of 105-135 hp, zone 308 can be associated with a filtered input of 140-170 hp, and zone 310 can be associated with a filtered input of 175-205 hp. A setting can be associated with the classified zone. For example, the setting can indicate a power production associated with an idle state of an aerial vehicle. For instance, a high pressure compressor/turbine rotor speed (e.g., a speed of an N2 turbine) of the one or more engine(s) can determine power generation of the one or more engine(s) in an idle state of the aerial vehicle. As shown in FIG. 3, in an example scheme, zone 304 can be used as a baseline speed for an N2 turbine during an idle state of the aerial vehicle, zone 300 can be associated with a 4% decrease in N2 speed from zone 304, zone 302 can be associated with a 2% decrease in N2 speed from zone 304, zone 306 can be associated with a 2% increase in N2 speed from zone 304, zone 308 can be associated with a 4% increase in N2 speed from zone 304, and zone 310 can be associated with a 6% increase in N2 speed from zone 304.

In an aspect, each zone of the plurality of zones 300, 302, 304, 306, 308, 310 can be separated from any adjacent zones by a buffer. For example, buffer 320 can be associated with a filtered input of 30-35 hp, buffer 322 can be associated with a filtered input of 65-70 hp, buffer 324 can be associated with a filtered input of 100-105 hp, buffer 326 can be associated with a filtered input of 135-140 hp, and buffer 328 can be associated with a filtered input of 170-175 hp. If a filtered input has a horsepower associated with a buffer and a current setting is the same as a setting associated with an adjacent zone of the buffer, then the filtered input can be classified into that adjacent zone and the setting can be maintained. For example, if an N2 speed is currently operating at the baseline speed associated with zone 304 and the filtered input is 68 hp, associated with buffer 322, then the filtered input can be classified into zone 304 and the setting can be maintained.

Optionally, a previously classified zone can be retrieved, such as zone 300. For example, the computing device 502 can retrieve a previously classified zone, such as zone 300. Optionally, a determination can be made that the filtered input is associated with a first buffer, such as buffer 320. For example, the computing device 502 can determine the filtered input is associated with a first buffer, such as buffer 320. The first buffer, such as buffer 320, can be adjacent to the previously classified zone, such as zone 300. Optionally, the filtered input can be classified into the previously classified zone, such as zone 300. For example, the computing device 502 can classify the filtered input into the previously classified zone.

Figure 4:
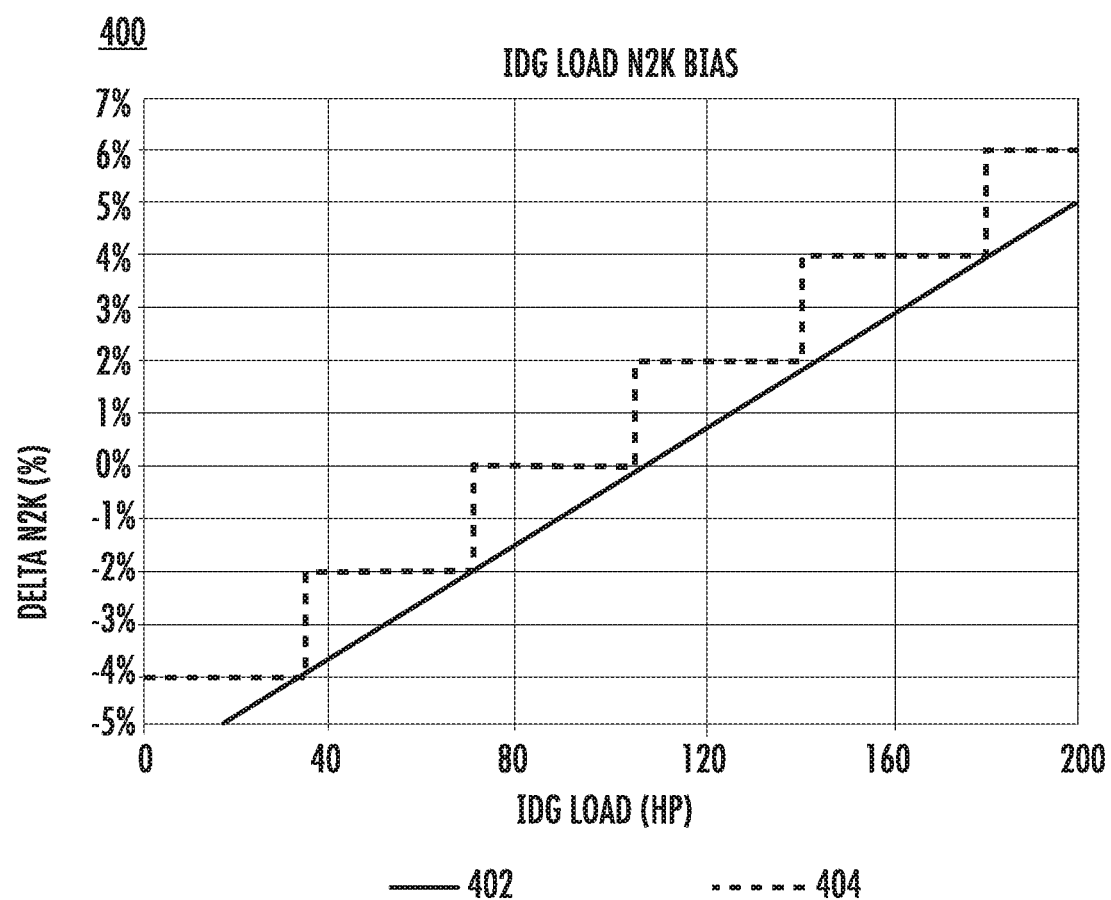
FIG. 4 depicts a graph illustrating results according to example embodiments of the present disclosure.

Turning now to FIG. 4, a graph 400 illustrating relationships of the idle setting to the filtered input according to example embodiments of the present disclosure is depicted. The graph 400 relates an electrical load to a power production of the engines of the aerial vehicles in an idle state. The solid indicator 402 shows how much power the engines of the aerial vehicle would produce (based on an N2 speed of the one or more engines of the aerial vehicle) for a particular electrical load of the aerial vehicle in the absence of the zone classification step. The dashed indicator 404 shows how much power the engines of the aerial vehicle are adjusted to account for the changing electrical load of the aerial vehicle after the filtered input is classified into a zone and the setting for the zone is applied.

At (208), a setting associated with the classified zone can be determined. For example, the computing device 502 can determine a setting associated with the classified zone. The setting can be related to power production. The setting can determine power production during an idle setting. At (210), an adjustment to the determined setting can be caused at a rate determined by a rate limit. For example, the computing device 502 can cause an adjustment to the determined setting at a rate determined by a rate limit. In an aspect, a direction in which the setting changes can determine the rate limit applied. For example, when the classified zone indicates that the setting should be increased, a first rate limit can be applied. As another example, when the classified zone indicates that the setting should be decreased, a second rate limit can be applied. When the setting indicates an allowance for decreasing power production, the change can happen gradually, so as to be nearly undetectable by operators and/or passengers of the aerial vehicle. When the setting indicates a need to increase power production, the need can be immediate, so such a rate limit can allow for a faster change than a rate limit applied to a decrease of power production. Optionally, when the adjustment to the determined setting includes increasing the determined setting, the rate limit can be a first rate limit. Optionally, when the adjustment to the determined setting includes decreasing the determined setting, the rate limit can be a second rate limit. Optionally, the first rate limit is different from the second rate limit. Optionally, the first rate limit can be larger than the second rate limit. Optionally, the first rate limit can be smaller than the second rate limit.

Figure 5:
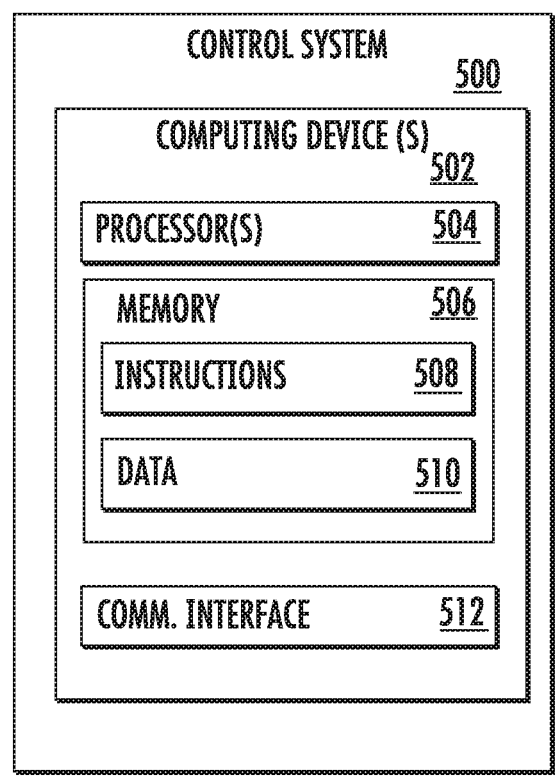
FIG. 5 depicts a control system for implementing one or more aspects according to example embodiments of the present disclosure.

FIG. 5 depicts a block diagram of an example control system 500 that can be used to implement methods and systems according to example embodiments of the present disclosure. The one or more aerial vehicle control system(s) 140 of FIG. 1, for example, can be the control system 500. As shown, the control system 500 can include one or more computing device(s) 502. The one or more computing device(s) 502 can include one or more processor(s) 504 and one or more memory device(s) 506. The one or more processor(s) 504 can include any suitable processing device, such as a microprocessor, microcontroller, integrated circuit, logic device, or other suitable processing device. The one or more memory device(s) 506 can include one or more computer-readable media, including, but not limited to, non-transitory computer-readable media, RAM, ROM, hard drives, flash drives, or other memory devices.

The one or more memory device(s) 506 can store information accessible by the one or more processor(s) 504, including computer-readable instructions 508 that can be executed by the one or more processor(s) 504. The instructions 508 can be any set of instructions that when executed by the one or more processor(s) 504, cause the one or more processor(s) 504 to perform operations. The instructions 508 can be software written in any suitable programming language or can be implemented in hardware. In some embodiments, the instructions 508 can be executed by the one or more processor(s) 504 to cause the one or more processor(s) 504 to perform operations, such as the operations for stabilizing input, as described with reference to FIG. 2.

The memory device(s) 506 can further store data 510 that can be accessed by the one or more processor(s) 504. For example, the data 510 can include any data used for stabilizing input, as described herein. The data 510 can include one or more table(s), function(s), algorithm(s), model(s), equation(s), etc. for stabilizing input according to example embodiments of the present disclosure.

The one or more computing device(s) 502 can also include a communication interface 512 used to communicate, for example, with the other components of system. The communication interface 512 can include any suitable components for interfacing with one or more network(s), including for example, transmitters, receivers, ports, controllers, antennas, or other suitable components.

Figure 6:
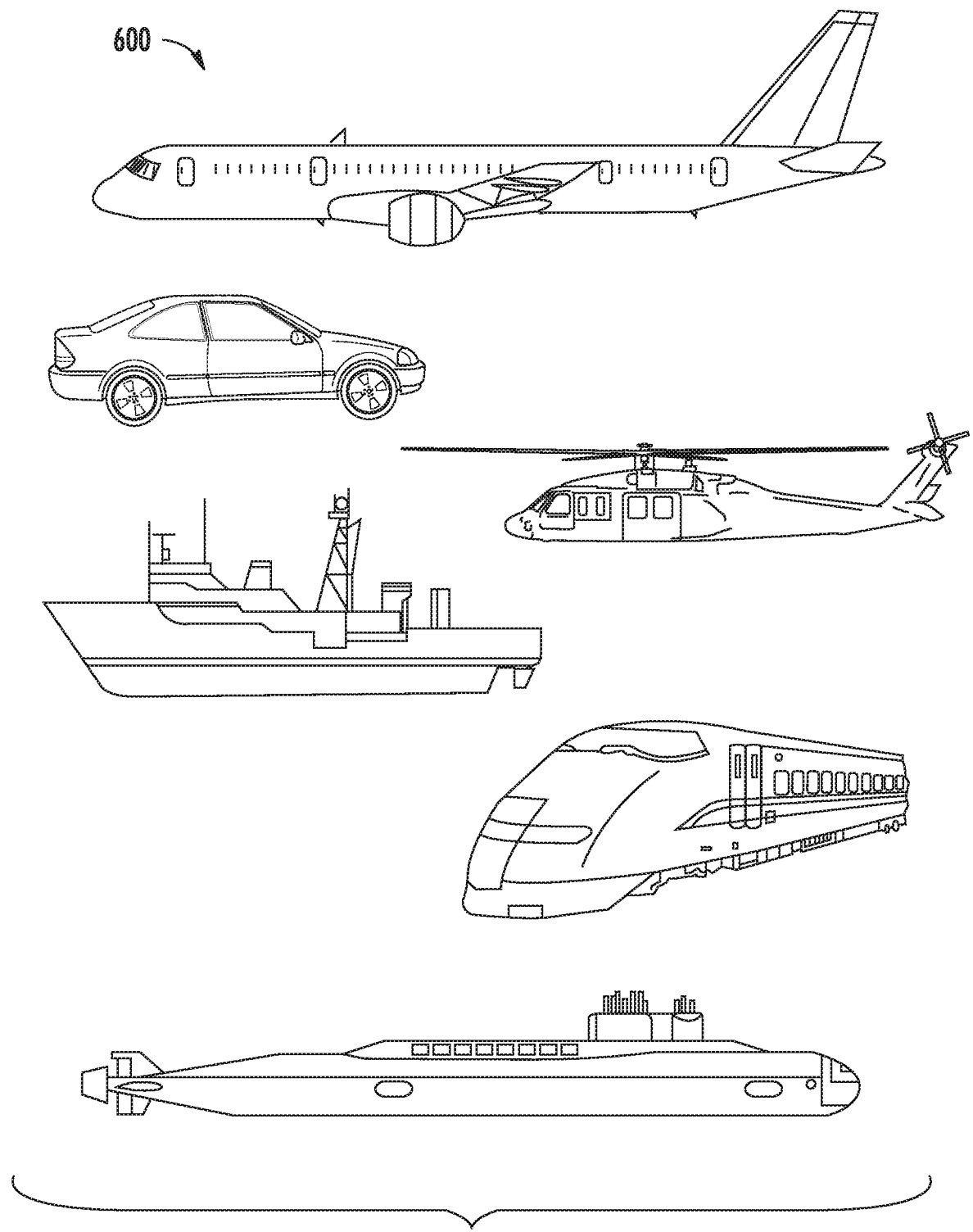
FIG. 6 depicts example vehicles according to example embodiments of the present disclosure.

Referring now to FIG. 6, example vehicles 600 according to example embodiments of the present disclosure are depicted. The systems and methods of the present disclosure can be implemented on an aerial vehicle, helicopter, automobile, boat, submarine, train, and/or any other suitable vehicles. While the present disclosure is described herein with reference to an aerial vehicle implementation, this is intended only to serve as an example and not to be limiting. One of ordinary skill in the art would understand that the systems and methods of the present disclosure can be implemented on other vehicles without deviating from the scope of the present disclosure.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method comprising:
receiving, by one or more computing devices, an input associated with an electrical load demand on an engine during idle operation;
classifying, by the one or more computing devices, the input into one zone of a plurality of zones;
determining, by the one or more computing devices, an idle setting associated with the zone in which the input is classified, wherein the idle setting determines an amount of power generated by the engine; and causing, by the one or more computing devices, an adjustment to the idle setting determined.

2. The method of claim 1, further comprising:
filtering, by the one or more computing devices, the input.

3. The method of claim 1, wherein each zone of the plurality of zones is separated from any adjacent zones by a buffer.

4. The method of claim 3, wherein classifying the input into one zone of the plurality of zones further comprises:
retrieving, by the one or more computing devices, a previously classified zone;
determining, by the one or more computing devices, that the input is associated with a first buffer, wherein the first buffer is adjacent to the previously classified zone; and
classifying, by the one or more computing devices, the input into the previously classified zone.

5. The method of claim 1, wherein the adjustment to the idle setting determined is caused, by the one or more computing devices, at a rate determined by a rate limit, and wherein when the adjustment to the idle setting determined comprises increasing the idle setting determined, the rate limit is a first rate limit, wherein when the adjustment to the determined setting comprises decreasing the determined setting, the rate limit is a second rate limit, and wherein the first rate limit is different from the second rate limit.

6. The method of claim 1, wherein the input changes erratically.

7. A system comprising:
a memory device; and
one or more computing devices configured to:
receive an input associated with an electrical load demand on an engine;
classify the input into one zone of a plurality of zones;
determine a setting associated with the classified zone, wherein the setting is related to an amount of power generated by the engine; and
cause an adjustment to the determined setting at a rate determined by a rate limit.

8. The system of claim 7, wherein the input associated with the electrical load demand on the engine is associated with one or more vehicle control systems of a vehicle.

9. The system of claim 7, wherein the setting is associated with an engine idle setting for a vehicle.

10. The system of claim 7, wherein each zone of the plurality of zones is separated from any adjacent zones by a buffer.

11. The system of claim 10, wherein the one or more computing devices are further configured to:
filter the input;
retrieve a previously classified zone;
determine that the filtered input is associated with a first buffer, wherein the first buffer is adjacent to the previously classified zone; and
classify the filtered input into the previously classified zone.

12. The system of claim 7, wherein when the adjustment to the determined setting comprises increasing the determined setting, the rate limit is a first rate limit, wherein when the adjustment to the determined setting comprises decreasing the determined setting, the rate limit is a second rate limit, and wherein the first rate limit is different from the second rate limit.

13. The system of claim 7, wherein the input changes erratically, wherein the input changes erratically when the electrical load demand on the engine changes by at least twenty percent (20%) of a full electrical load capacity nearly instantaneously.

14. A vehicle comprising:
an engine;
a system, comprising:
a memory device; and
one or more computing devices configured to:
receive an input associated with an electrical load demand on the engine while the engine operates in an idle state;
filter the input;
classify the input into one zone of a plurality of zones;
determine a setting associated with the classified zone, wherein the setting determines power production of the engine while operating in the idle state; and
cause an adjustment to the determined setting at a rate determined by a rate limit.

15. The vehicle of claim 14, wherein the vehicle is an aerial vehicle, and wherein the aerial vehicle comprises one or more aerial vehicle control systems, and wherein the input associated with the electrical load demand on the engine is associated with the one or more aerial vehicle control systems.

16. The vehicle of claim 14, wherein each zone of the plurality of zones is separated from any adjacent zones by a buffer.

17. The vehicle of claim 16, wherein the one or more computing devices are further configured to:
retrieve a previously classified zone;
determine that the filtered input is associated with a first buffer, wherein the first buffer is adjacent to the previously classified zone; and
classify the filtered input into the previously classified zone.

18. The vehicle of claim 14, wherein when the adjustment to the determined setting comprises increasing the determined setting, the rate limit is a first rate limit, wherein when the adjustment to the determined setting comprises decreasing the determined setting, the rate limit is a second rate limit, and wherein the first rate limit is different from the second rate limit.

19. The vehicle of claim 18, wherein the first rate limit is larger than the second rate limit.

20. The vehicle of claim 14, wherein the engine comprises a rotor, and wherein when the one or more computing devices cause the adjustment to the determined setting at the rate determined by the rate limit, a rotor speed of the rotor is adjusted.

* * * * *